F. I. LEACH.
AUTOMATIC TRAIN STOP.
APPLICATION FILED SEPT. 26, 1913.

1,115,443.

Patented Oct. 27, 1914.
3 SHEETS—SHEET 1.

Witnesses
W. R. Smith.
John J. McCarthy

Inventor
F. I. Leach.
By Victor J. Evans
Attorney

F. I. LEACH.
AUTOMATIC TRAIN STOP.
APPLICATION FILED SEPT. 26, 1913.

1,115,443.          Patented Oct. 27, 1914.
3 SHEETS—SHEET 2.

Inventor
F. I. Leach.

Witnesses
W. R. Smith.
John J. McCarthy

By Victor J. Evans
Attorney

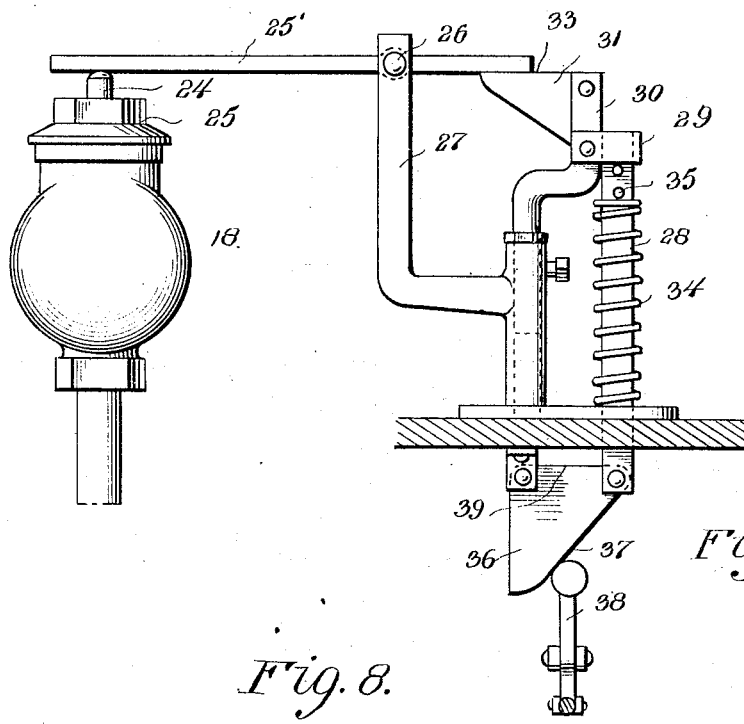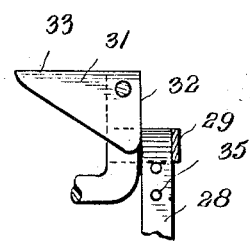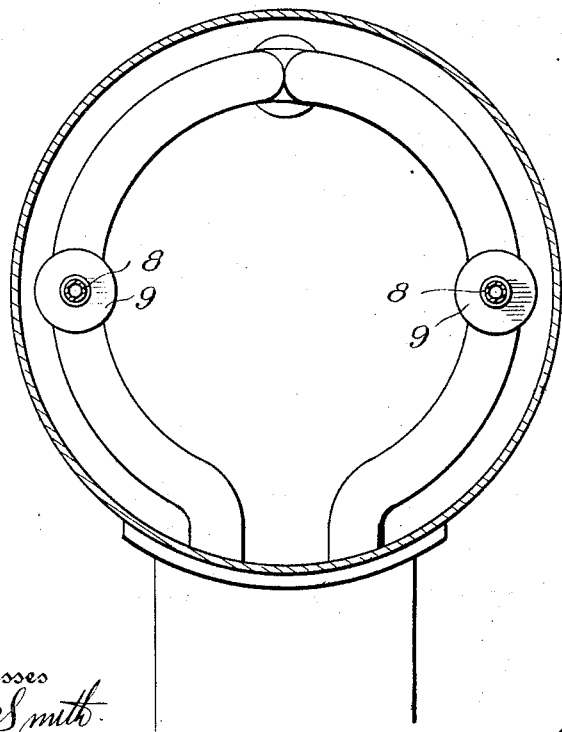

UNITED STATES PATENT OFFICE.

FREDERICK I. LEACH, OF LYNN, MASSACHUSETTS.

AUTOMATIC TRAIN-STOP.

1,115,443.  Specification of Letters Patent.  Patented Oct. 27, 1914.

Application filed September 26, 1913. Serial No. 792,036.

*To all whom it may concern:*

Be it known that I, FREDERICK I. LEACH, a citizen of the United States, residing at Lynn, in the county of Essex and State of Massachusetts, have invented new and useful Improvements in Automatic Train-Stops, of which the following is a specification.

This invention relates to improvements in automatic train stops and has particular application to a train stopping apparatus whereby the flow of steam from the boiler to the engine cylinders is cut off and the air brakes applied to bring the train to a standstill in the event of the same passing a danger signal.

In carrying out the present invention, it is my purpose to provide an automatic train stopping apparatus which will embody among other features a pressure operated valve located in the steam main between the steam dome of the boiler and the engine cylinders and under the influence of the air pressure in a branch pipe connected up with the brake pipe, a check valve being interposed in the connection between the branch pipe and the brake pipe so that back flow from the branch pipe to the brake pipe is avoided and whereby the valve will remain uninfluenced upon a reduction of the train line air pressure by the manipulation of the engineer's brake valve, a pressure release valve being connected in the branch pipe and normally closed and operable to effect a reduction in the pressure in the branch pipe and the brake pipe by way of the check valve thereby causing an application of the brakes and the operation of the pressure operated valve to cut off the flow of steam to the drive cylinders of the engine.

It is also my purpose to provide an apparatus of the class described wherein the pressure release valve connected in the branch pipe will be pressure operated and under the influence of a car carried trip adapted to be operated from an obstacle or track detent under the control of the roadway signal system or manually controlled as desired.

With the above and other objects in view, the invention consists in the construction, combination and arrangement of parts hereinafter set forth in and falling within the scope of the claim.

Figure 1:
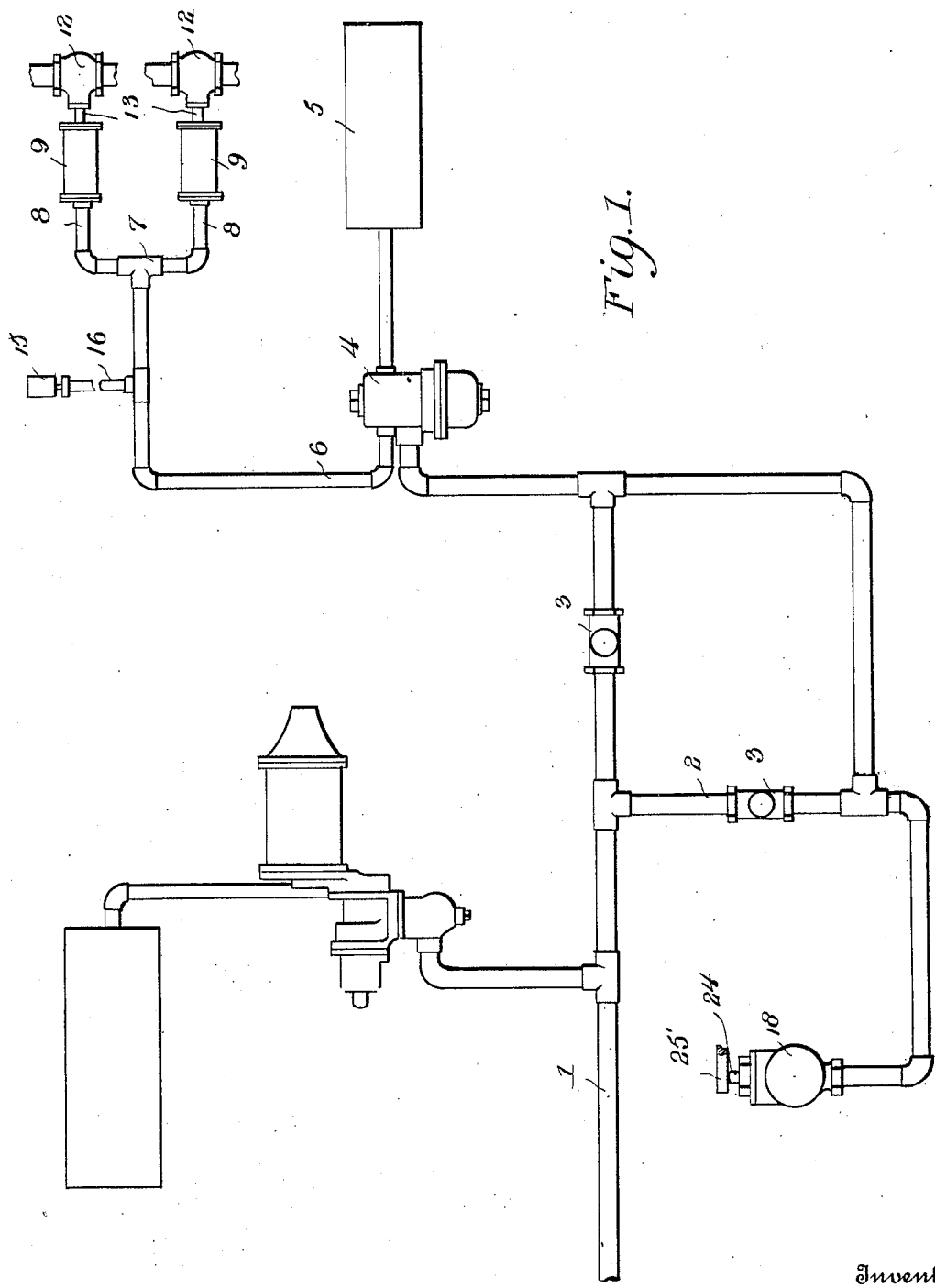
Figure 2:
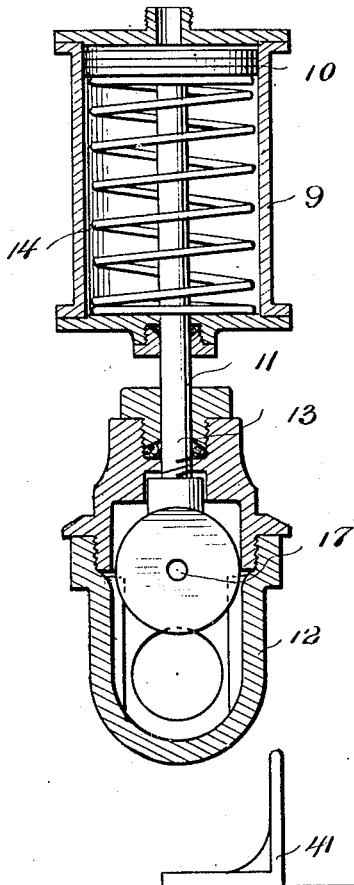
Figure 3:
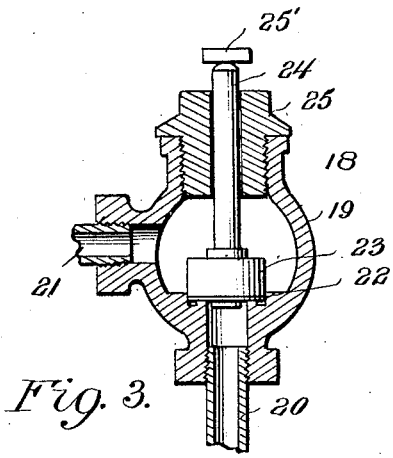
Figure 6:
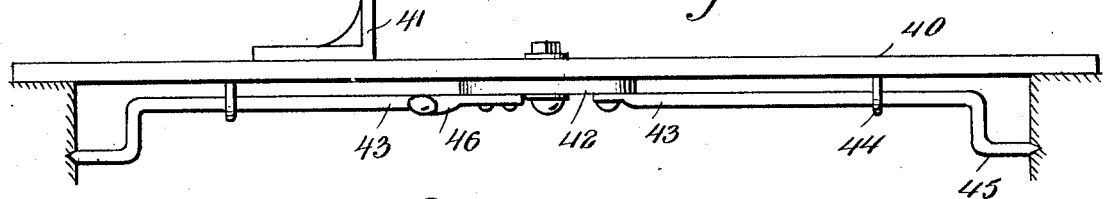
Figure 7:
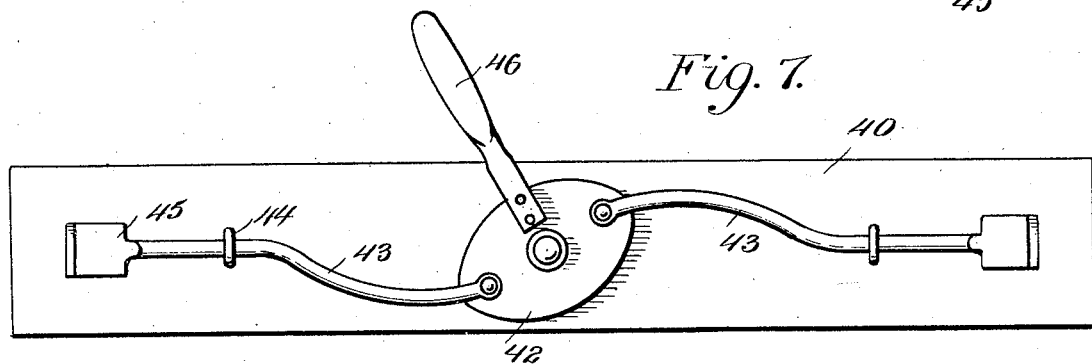

In the accompanying drawings; Figure 1 is a diagrammatic plan view of an automatic train stopping apparatus constructed in accordance with my present invention. Fig. 2 is a vertical sectional view through one of the pressure operated cut off valves. Fig. 3 is a similar view of the pressure release valve. Fig. 4 is a fragmentary side elevation of a locomotive showing the trip carried thereby. Fig. 5 is a sectional view therethrough. Fig. 6 is a view in side elevation of a modified form of obstacle or track detent. Fig. 7 is a bottom plan view thereof.

Referring now to the accompanying drawings in detail, 1 designates the brake pipe of the air brake system, while 2 indicates a branch pipe connected up with the brake pipe 1. In the present instance, both extremities of the branch pipe 2 are in communication with the brake pipe and at the points of connection between the branch pipe and the brake pipe, check valves 3 are employed, such valves acting to permit the air to flow from the brake pipe into the branch pipe or preventing back flow from the branch pipe into the brake pipe.

Tapped onto the branch pipe 2 adjacent to one of the check valves is a triple valve 4 under the control of the air pressure in the branch pipe and controlling communication between a source of fluid supply, as an air tank 5 and a conduit 6. The free end of the conduit 6 is connected through the medium of a T-coupling 7 with pipes 8, 8 leading into the cylinders 9, 9 within each of which is mounted for sliding movement a piston 10 having a piston rod 11 projecting outwardly of one end of the cylinder and working within a suitable stuffing box. Connected in the branch pipe of the steam main leading from the boiler to the engine cylinders are cut off valves 12, 12 shown in the present instance, to be key valves and having the stems 13, 13 thereof suitably connected with the outer ends of the piston rods 11. Surrounding the piston rod within the respective cylinder is a coiled expansion spring 14 having one end thereof bearing upon the end of the cylinder through which the piston rod passes and the opposite end in engagement with the adjacent face of the piston, such springs acting to hold the valves normally open.

In practice, when the pressure in the branch pipe 2 is reduced, the triple valve 4 is operated to establish communication between the source of fluid supply 5 and the cylinders 9, 9 thereby permitting the air to flow through the conduit 6, T-coupling 7 and pipes 8, 8 into the cylinders to slide the pistons therein against the action of the springs 14 and so close the valve, thus cutting off communication between the steam dome of the boiler and the engine cylinders. In the present instance, I have shown the cut off valve in each branch of the steam main leading to the engine cylinders and in this connection I wish it to be understood that but a single valve need be employed and installed in the steam main between the Y-coupling therein and the engineer's throttle valve.

If desired, an audible signal such, for instance, as an air operated whistle 15 may be employed and located in the engine cab and connected up with the conduit 6 by way of a pipe 16 so that when the cut off valves are operated to closed position the signal will be sounded to advise the engineer. The gate of each valve is preferably formed with a transverse aperture 17 so that the steam within the main may equalize upon both sides of the valve subsequent to the engineer closing the throttle, thereby permitting the valves to be opened when the air pressure within the cylinders is released and the springs react.

Simultaneously with the reduction of the pressure in the branch pipe, the train line air pipe or brake pipe is bled by way of the check valve so that the air brakes are applied. When the air pressure in the brake pipe and the branch pipe is restored, the triple valve 4 operates to establish communication between the cylinders 9, 9 and the atmosphere and cut off communication between such cylinders and the tank 5 and establish communication between the tank and the pump therefor, as is well understood by those familiar with the operation of triple valves.

In order that the pressure in the branch pipe 2 and the brake pipe 1 may be reduced automatically, I employ a pressure release valve 18 comprising, in the present instance, a casing 19 connected in the branch pipe and formed with a passage 20 opening into the branch pipe, a discharge port 21 at right angles to such passage and a seat 22 between the discharge port 21 and the passage 20. Engaging this seat 22 is a valve 23 provided with a stem 24 projecting outwardly through the hood or cap 25 on the valve casing. This valve is of the pressure operated type, that is, to say, opens under the pressure in the branch pipe and in order to maintain the valve normally closed the outer end of the stem 24 thereof is connected to one end of a lever 25 fulcrumed between its ends as at 26 upon a vertical standard 27 secured to an appropriate part of the locomotive in proximity to one line of rails of the trackway. This lever is under the control of a car carried trip comprising a vertically movable plunger 28 mounted within a bearing carried by the locomotive frame and disposed in parallelism with the standard 27. The upper end of this plunger slides within a guide 29 secured to and extending outwardly from the standard 27 and extending upwardly from the guide and connected thereto are pivot ears 30 spaced apart in parallelism and having pivotally mounted therebetween an angle lever 31 comprising a vertical arm 32 normally engaging one side of the plunger 28 adjacent to the top thereof and a horizontal arm 33 disposed below and normally engaged by the free end of the lever 25 so as to prevent the opening of the valve 23 under the pressure within the branch pipe 2. Surrounding the plunger 28 is a coiled expansion spring 34 having the upper end thereof abutting a pin 35 carried by the plunger and the lower end in engagement with the bearing of the plunger, such spring acting normally to hold the plunger elevated. Pivoted to the lower portion of the locomotive is a bell crank lever 36 having the depending vertical arm 37 adapted to be engaged by a track detent or obstacle 38 controlled from the road signals or in any other desired manner, and the horizontal arm 39 connected with the lower end of the plunger 28.

Assuming a train equipped with my improved stopping mechanism to pass a danger signal, it will be seen that the lower end of the vertical arm 37 of the bell crank lever 36 will engage the obstacle 38 whereby the bell crank lever will be swung about its pivot and the plunger 28 lowered against the action of the spring 34. As the plunger is lowered, the upper end thereof is removed from the path of movement of the vertical arm 32 of the angle lever 31 thereby permitting the latter to swing about its pivot under the action of the lever 25 and the pressure on the valve 23. Thus, the pressure release valve is opened and the air pressure in the branch pipe and the brake pipe reduced so that the brakes are applied to the wheels and the flow of steam from the boiler to the engine cylinders cut off, as previously described, thereby bringing the train to a standstill.

In Fig. 7 of the drawings, I have illustrated a modified form of track detent or obstacle and, in this instance, the obstacle is of the portable type and is designed to be carried by one of the train crew so that should a train be stalled for any reason one of the crew may place the obstacle at a safe distance behind the train so as to bring a following train to a standstill and thereby avert a collision or the like. This trip comprises a base board or plate 40 adapted to rest upon and span the space between two adjacent ties or sleepers in parallelism with the rails of the trackway. Extending upwardly from the base board and suitably fastened thereto is a vertical member 41 adapted, when the obstacle is in position, to be engaged by the lower end of the vertical arm 37 of the bell crank lever 36 so as to operate the car carried trip as aforesaid. Rotatably mounted upon the under surface of the base board is a cam plate 42 having connected thereto at diametrically opposite points arms 43, 43 slidably mounted within suitable bearings 44, 44 and equipped at their outer ends with prongs 45. Secured to the cam plate at a point between the arms is a handle 46. By means of this construction, it will be seen that when the base board is seated upon the ties and the cam plate rotated under the action of the handle 46, the arms 43, 43 will slide outwardly of each other and so cause the prongs 45, 45 to be embedded in the rail ties thereby securely holding the obstacle in position. The active edges of the prongs are preferably sharp so that the same may readily pass through ice and the like on the ties.

From the foregoing description taken in connection with the accompanying drawings, the construction and mode of operation of my invention will be readily apparent. It will be seen that I have provided an automatic train stop wherein the train line air pressure controls the communication between the steam dome of the boiler and the engine cylinders in addition to the air brakes of the train, while the pressure in the brake pipe may be reduced by the engineer, when it is desired to bring the train to a stop, without affecting the pressure cut off valve in the steam main.

While I have herein shown and described certain preferred forms of my invention by way of illustration, I wish it to be understood that I do not limit or confine myself to the precise details of construction herein described and delineated, as modification and variation may be made within the scope of the claim without departing from the spirit of the invention.

I claim:

In train stopping apparatus, the combination with the brake pipe, of a pressure release valve adapted to establish communication between said pipe and the atmosphere and open under the air pressure in the pipe, a standard disposed adjacent to said valve, a lever fulcrumed within the upper end of said standard and having one end engaging the stem of said valve to hold the latter normally closed, a guide secured to said standard, pivot ears upstanding from said guide, a bell crank lever pivoted between said ears and having a horizontal limb engaging the adjacent end of said lever to hold the latter against movement under the action of the valve and a vertical limb, a plunger slidably mounted within said guide and engaging the vertical limb of said bell crank lever, a spring holding said plunger normally in engagement with the lever, and means for actuating said plunger to release said lever whereby the valve will be opened.

In testimony whereof I affix my signature in presence of two witnesses.

FREDERICK I. LEACH.

Witnesses:
  RICHARD L. SISK,
  RUDOLPH W. CURRIER.